United States Patent [19]

Seachman et al.

[11] Patent Number: 5,621,217
[45] Date of Patent: Apr. 15, 1997

[54] APPARATUS AND METHOD FOR CALIBRATING A DIGITAL SCANNER

[75] Inventors: Ned J. Seachman, Penfield; Joseph P. Taillie, Pittsford, both of N.Y.

[73] Assignee: Xerox Corporation, Stamford, Conn.

[21] Appl. No.: 535,394

[22] Filed: Sep. 28, 1995

[51] Int. Cl.⁶ .................................................. H04N 1/047
[52] U.S. Cl. ................................. 250/559.1; 250/559.39
[58] Field of Search ........................ 250/559.1, 559.39, 250/234, 235, 236; 358/406

[56] References Cited

U.S. PATENT DOCUMENTS

| | | | |
|---|---|---|---|
| 3,952,144 | 4/1976 | Kalker | 178/6 |
| 4,216,503 | 8/1980 | Wiggins | 358/280 |
| 4,555,732 | 11/1985 | Tukra | 358/213 |
| 4,605,970 | 8/1986 | Hawkins | 358/406 |
| 4,750,490 | 6/1988 | Haw et al. | 40/300 |
| 5,118,183 | 6/1992 | Cargill et al. | 356/73 |
| 5,404,232 | 4/1995 | Selby | 358/406 |
| 5,424,537 | 6/1995 | Lehman et al. | 250/235 |

OTHER PUBLICATIONS

English Abstract of Published Japanese Patent Application JP7273954-A, (E91: Exposing Apparatus), Oct. 20, 1995.

*Primary Examiner*—Edward P. Westin
*Assistant Examiner*—Kevin Pyo
*Attorney, Agent, or Firm*—Michael J. Nickerson

[57] ABSTRACT

A system for calibrating a digital scanner utilizes a calibration strip having reference information printed thereon and a machine readable encoded tag having characteristic values corresponding to the calibration strip reference information encoded thereon. A scanning system scans the calibration strip and the machine readable encoded tag to generate image data corresponding to scanned-in reference information and data corresponding to scanned-in characteristic values of the reference information. The correction values are then derived from the generated image data and the decoded characteristic values that accurately describe the desired image data.

2 Claims, 3 Drawing Sheets

APPARATUS AND METHOD FOR CALIBRATING A DIGITAL SCANNER

FIELD OF THE PRESENT INVENTION

The present invention, generally, is directed to a device for calibrating a digital scanner. More specifically, the present invention is directed to a method and apparatus for providing calibration reference data to a digital scanner during a calibration scanning operation.

BACKGROUND OF THE PRESENT INVENTION

A problem prevalent in the generation of electronic data, especially, image or video data, is maintaining a calibrated scanner. The calibration process is used to correct for offset errors and gain errors in the video signal. Offset and gain errors can be caused by the characteristics of individual components responsible for converting the light reflected from the image into electronic image data. These errors may result from nonuniformities in the characteristics of the illumination and sensing components in the scanner, as well as from time varying drifts of such characteristics. For example, a charged coupled device (CCD) sensor may have inherent offset and gain characteristics unique to itself or a scanner may contribute to offset and gain errors due to the present operating conditions such as the operating temperature, lamp color temperature, age, etc. If offset errors or gain errors are not adequately addressed; i.e., the signal being processed is not adjusted to counteract the offset or gain errors; the processing of the signal will not be accurate which, in an image processing system, can cause the generated picture or image to have a lower quality.

To address these problems, typical image processing systems or image scanning systems perform calibrations of the imaging system at intervals. Often, the calibration is performed at power-up but, in some cases, calibration is performed at fixed intervals, sometimes as frequently as each scan. Following are examples of systems which perform calibration routines.

An example of a device which performs calibration once every predetermined number of scans is the device disclosed in U.S. Pat. No. 3,952,144 to Kolker. Kolker discloses that a facsimile transmitter makes a preliminary calibrating scan in which the transmitter sequentially scans a known black area and a known white area. An automatic background and contrast control unit stores a first sample of the uncorrected video signal which represents the scanned black area and stores a second sample of the uncorrected video signal which represents the scanned white area. During subsequent scanning, the automatic background and contrast control unit continually produces voltages representing the stored black and white samples and uses these voltages to correct the video signal received during the scanning of the document.

Another example of a device which corrects for offset and gain errors is disclosed in U.S. Pat. No. 4,555,732 to Tuhro. This U.S. Patent discloses an image sensor correction system which maintains the offset voltages in the shift registers of a multi-channel image sensor substantially equal. U.S. Pat. No. 4,555,732 discloses that a pair of control gates permits sampling the existing offset voltages in the shift register of each channel to provide an adjusted potential for balancing any voltage differences between the shift registers. More specifically, U.S. Pat. No. 4,555,732 discloses a device which compares the various offsets of a plurality of shift registers and determines a single offset potential to be applied to each shift register according to the comparison.

A device which proposes to correct gain and offset errors due to changes in the operating characteristics of a CCD is disclosed in U.S. Pat. No. 4,216,503 to Wiggins. U.S. Pat. No. 4,216,503 discloses a system where dark and light level signals are isolated and processed by a microprocessor unit in accordance with a pre-established routine to provide an offset potential and gain multiplicand. The determined offset potential and gain multiplicand are used to remove the offset and set a signal gain for the next succeeding line of image signals. The process is then repeated for each line of image signals to be outputted from the CCD.

Although U.S. Pat. No. 4,216,503 discloses a device to correct offset and gain errors on a continual basis, such a process is not adaptable to correct offset or gain errors in a high speed copier or errors in a fast scan direction parallel to the CCD because this method only corrects for offset errors or gain errors in a slow scan direction perpendicular to the CCD. In other words, the technique disclosed by U.S. Pat. No. 4,216,503 adjusts the offset gain value only upon the completion of a scanning of a full line of data.

The calibration of a conventional digital scanner is illustrated in FIG. 4. An optical system is positioned so as to scan a strip of calibration material 3. More specifically, during a calibration process, the digital scanner causes a lamp 1 to illuminate both a dark area 13 and a white area 12 of a calibration strip 3. The light reflected from the calibration strip 13 is directed towards a sensor array 7 which may be either a CCD sensor or a full width array sensor. The sensor array 7 converts the light into electrical signals corresponding to digital image data representing the image that has been scanned, namely the image of the calibration strip 3. This image data is then fed to a calibration circuit 9 which with information received from a nonvolatile memory 20 produces offset and gain correction data for each sensor pixel. The information received from the nonvolatile memory 20 includes the predetermined or pre-measured reflectance values of the several portions of the calibration strip 3. The calibration circuit 9 then produces offset and gain correction data by comparing the signal from each of the sensor's pixels with the predetermined value for the calibration strip. This correction data is stored in memory and used to correct the gain and offset of each pixel during normal scanning operation, thus providing a signal representative of image data which is fully calibrated and corrected for any errors in the sensor array or variations in the lamp's properties.

A problem associated with calibration is the establishment of the reference reflectance values of the calibration strip. During calibration of digital scanners as noted above, an optical system (a lamp 1, sensor array 7, and lens 14) is positioned, as illustrated in FIG. 4, to allow the sensor array 7 to view a strip of calibration information and/or patterns 3 located on or near the platen. It is important that an accurate value of the reflectance of this calibration strip 3 be known to the digital scanner to achieve an absolute reflectance calibration and generate accurate correction values for subsequent document reading operations. Unfortunately, the variation in calibration strip reflectance, particularly, batch to batch, is presently greater than is required to achieve the desired calibration accuracy.

To counter this variation in the calibration strip reflectance, some conventional digital scanners include a writable portion of the nonvolatile memory 20 which stores the measured strip's reflectance. Thus, it is necessary to manually enter the measured strip's reflectance into the conventional scanner's nonvolatile memory 20 each time a new calibration strip 3 is installed, either during initial assembly in the factory or during replacement in the field. The requirement of manually entering the measured strip's reflectance into the scanner's nonvolatile memory 20 adds cost to the assembly and field service of the digital scanner and it presents opportunities for error which can significantly impact the digital scanner's image quality.

The present invention provides a machine readable tag or portion with each calibration strip that has encoded thereon the strip's reflectance values so that the scanner can automatically read the strip's reflectance values during a calibration routine. This eliminates the need of a user or technician to manually enter the information.

SUMMARY OF THE PRESENT INVENTION

One aspect of the present invention is a method for calibrating a digital scanner. The method includes scanning a calibration strip having reference information printed thereon; scanning a machine readable encoded tag having characteristic values corresponding to the calibration strip encoded thereon; and producing correction values for subsequent scans from image data.

Another aspect of the present invention is a system for calibrating a digital scanner. The system includes a calibration strip having reference information printed thereon and a machine readable encoded tag having characteristic values corresponding to the calibration strip encoded thereon. A scanning system is provided to scan the calibration strip and the machine readable encoded tag, and calibration means is operatively connected to the scanning system for generating correction values from image data corresponding to scanned-in reference information and data from the scanned-in encoded tag that accurately identifies the characteristic values of the reference information.

A third aspect of the present invention is a calibration strip for a digital scanner. The calibration strip includes a first portion having reference information printed thereon and a second portion having characteristic values corresponding to the calibration strip reference information machine readably encoded thereon.

Further objects and advantages of the present invention will become apparent from the following description of the various embodiments and characteristic features of the present invention.

BRIEF DESCRIPTION OF THE DRAWINGS

The following is a brief description of each drawing used to describe the present invention, and thus, are being presented for illustrative purposes only and should not be limitative of the scope of the present invention, wherein.

DETAILED DESCRIPTION OF THE PRESENT INVENTION

Figure 1:
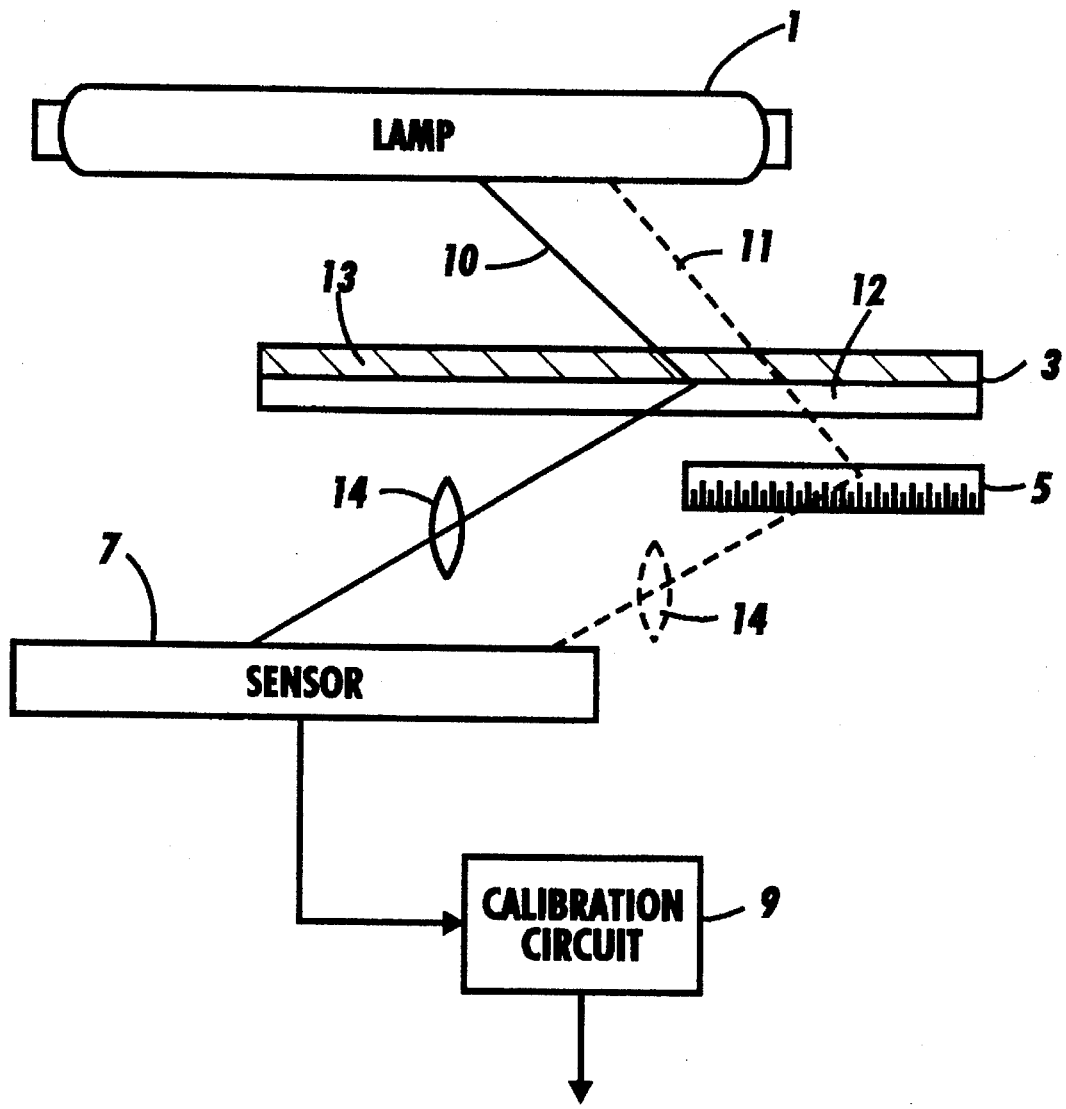
FIG. 1 is a block diagram illustrating one embodiment of the present invention.

For a general understanding of the present invention, reference is made to the drawings. In the drawings and in the specification, like reference numerals have been used throughout to designate identical or equivalent elements or steps.

FIG. 1 illustrates one embodiment of the present invention. As illustrated in FIG. 1, a lamp 1 illuminates a calibration strip 3 with light 10 during a calibration process. The calibration strip has reference information such as regions of substantially constant reflectance printed thereon and a machine readable encoded tag having characteristic values corresponding to the calibration strip encoded thereon. In the preferred embodiment, these characteristic values are reflectance values. More specifically, the lamp 10 illuminates both the dark area 13 and the white area 12 of the calibration strip 3 such that the light reflected from the calibration strip 3 is imaged onto a sensor array 7 through a lens system 14.

As noted above, the sensor array 7 may be a CCD sensor or a full width array sensor. The sensor array 7 receives the light reflected from the calibration strip 3 and converts this light into electrical signals of digital image data representing the reflectance of the calibration strip. This digital image data is then fed into a calibration circuit 9.

Subsequent to or before the scanning of the calibration strip 3, the digital scanner of the present invention causes the lamp 1 to produce light 11 so as to scan a machine readable tag 5. The coding mechanism used to record the reflectance values of the calibration strip is immune to the error in reflectance that may be present in the image data before scanning and interpretation of the coded reflectance values. The light reflected from the machine readable tag 5 is received by the sensor array 7 which converts this light into electrical signals of digital image data representing the information on the machine readable tag. This digital information is also fed to the calibration circuit 9.

The calibration circuit 9 converts the digital information read when scanning the machine readable tag into calibration strip characteristic values, such as reflectance values, for the particular calibration strip in the digital scanner. These calibration strip characteristic values can then be utilized along with the signal obtained by scanning the calibration strip reference information in any well-known or conventional process to determine the calibration correction values which are generated by the calibration circuit 9. These correction values may provide correction, for example, for offset and gain errors within the sensor array or variations in the color temperature or other properties of the lamp 1.

As illustrated in FIG. 1, the machine readable tag is located in an area which is offset from the quality zone, the area of the calibration strip having the test patches used in generating image data for the calibration process, of the calibration strip in the slow-scan direction. Thus, a conventional sensor array can be used without modification to read the required unique values each time the digital scanner's memory needs to be refreshed. This offsetting of the machine readable tag in the slow-scan direction merely requires a small extension of the digital scanner's total slow scan excursion distance.

Figure 2:
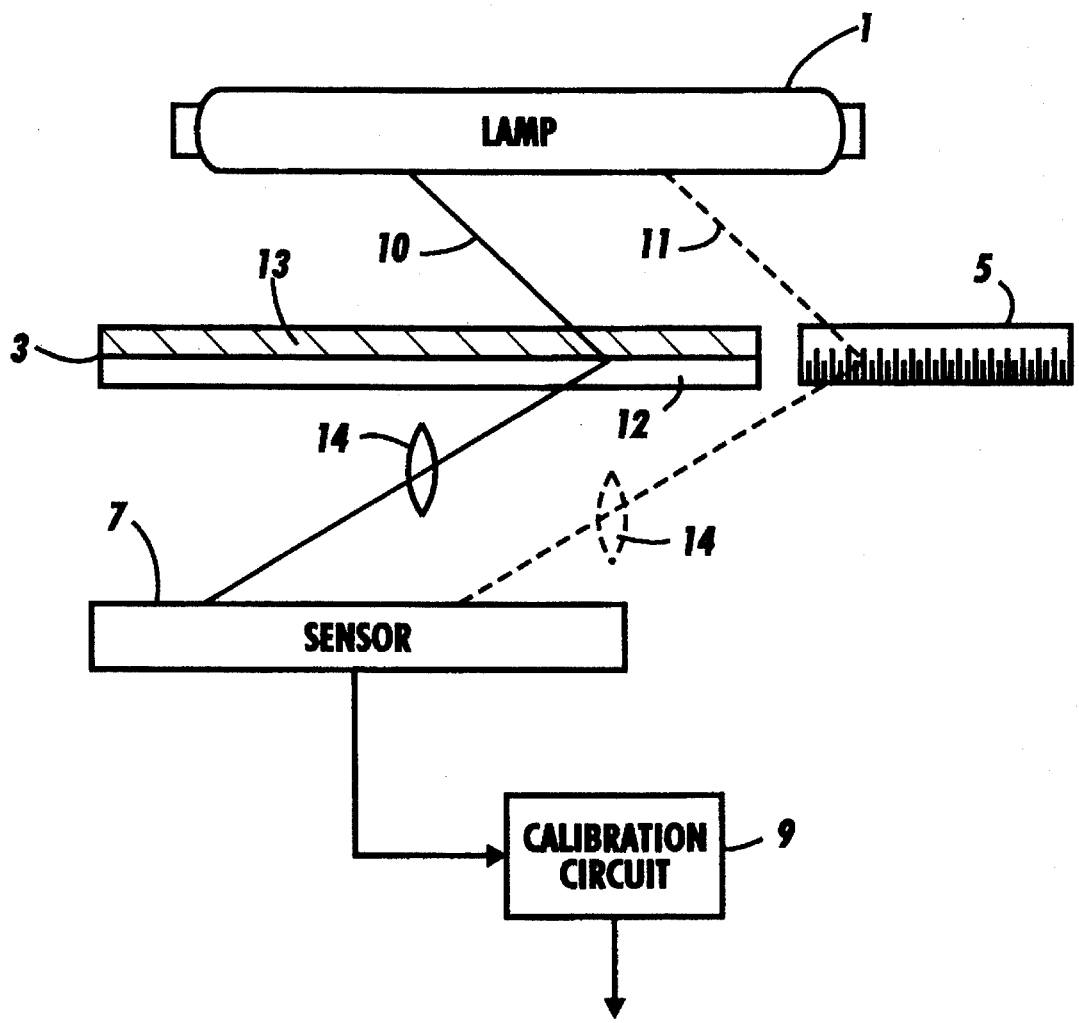
FIG. 2 is a block diagram illustrating another embodiment of the present invention.

As illustrated in FIG. 2, the machine readable tag is located on the calibration strip in a position beyond the quality zone wherein the machine readable tag is offset from the quality zone in the fast-scan direction. With respect to this embodiment of the present invention, additional pixels may need to be provided on the sensor array or a separate sensor may be required to read the information on the machine readable tag.

As explained above, the present invention utilizes a machine readable tag to store the calibration strip's measured characteristics of which measured reflectance is just one example. This machine readable tag is affixed to the calibration strip in a location outside the quality zone of the calibration strip. Moreover, this tag is positioned such that it will not interfere with the scanning of the calibration strip during a calibration scan, but is positioned so as to be easily accessed or scanned by the sensor array when it is desired to read the machine readable tag.

The machine readable tag may take the form of a standard or customized bar code, color encoded features, glyphs, or any other reasonably compact form in which the desired calibration strip's unique values may be encoded in a machine readable fashion.

Moreover, although it has been described above that the machine readable tag is part of the calibration strip, the machine readable tag may be separate from the calibration strip. In this embodiment, the machine readable tag is still uniquely encoded with the information about the characteristic values of the calibration strip and shipped together with the calibration strip; however, the machine readable tag by being separate from the calibration strip enables the positioning of the machine readable tag in a different portion of the scanned area. This enabling of the positioning of the machine readable tag in a different portion of the scan area can offer physical or logistical advantages over a tag affixed directly to the calibration material.

Furthermore, although the present invention has been described as utilizing the machine readable tag for identification of the unique reflectance values of the calibration strip, other characteristic values could be easily encoded into the machine readable tag. For example, the machine readable tag may include color coordinate information pertaining to one or more color zones on the calibration strip, spatial coordinates to locate one or more quality zones or features within the calibration strip, and other values unique to a particular strip which could assist the calibration or other machine logic processes. An example of the use of such other values is the determination of magnification error of the scanning system by comparing the separation between two readable fiducial marks as determined by the scanner to a known separation that is encoded into the tag.

Also, the information for the machine readable tag may be affixed to the calibration material by either printing, embossing, punching, or other marking processes which can generate an adequate foreground to background reflectance ratio and thus be reliably sensed using the scanner's existing illumination system.

Figure 3:
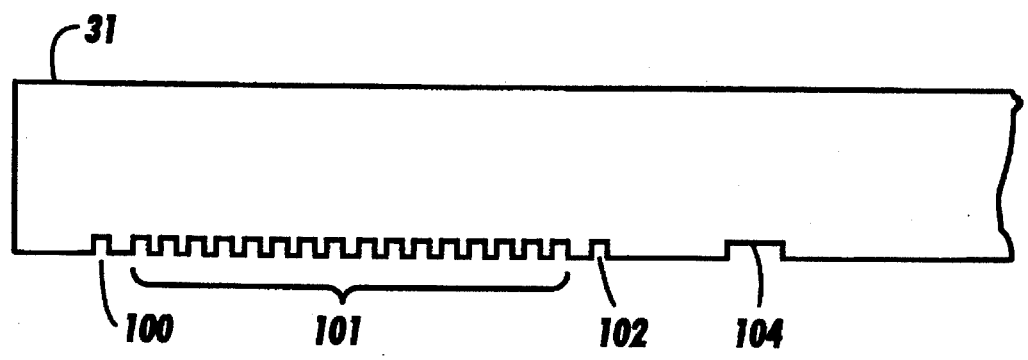
FIG. 3 illustrates a third embodiment of the present invention.
Figure 4:
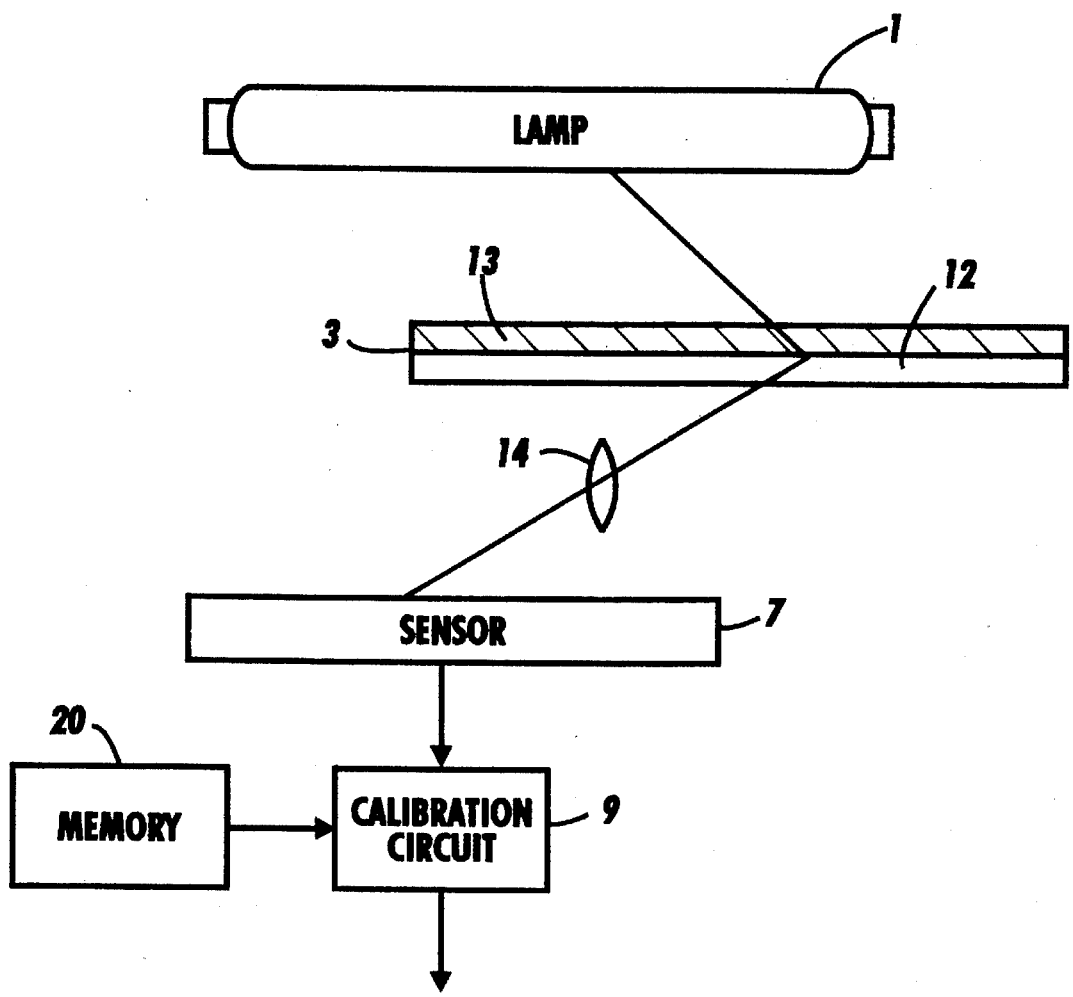
FIG. 4 is a block diagram illustrating a calibration routine for a conventional digital scanner.

FIG. 3 illustrates another embodiment of the present invention which implements a machine readable tag to provide information for a color calibration process. In this embodiment, reference information in 3 distinct colors is included in the calibration strip's quality area and the actual characteristic values of the calibration strip for each of the 3 color bands are encoded into a narrow zone along the edge of the calibration strip in a series of notches. More specifically, the calibration strip is notched with a start mark 100, an 18 bit code 101, and an end mark 102. A version mark 104 is also included which can be employed in the selection of the constants used to decode the notches.

Using the embodiment shown in FIG. 3 to illustrate one method of encoding of the calibration strip reflectance values, a red reflectance error code $E_R$ is encoded in bits 1–6; a green reflectance error code $E_G$ is encoded in bits 7–12; and a blue reflectance error code $E_B$ is encoded in bits 13–18. These error codes are simply the binary equivalent of the corresponding notches. From this embodiment, the actual red, green, blue, reflectance values ($P_R$, $P_G$, $P_B$, respectively) can be calculated from the following equation $P_x = P_0 + (E_x - 2^{N-1}) \Delta P$, wherein $P_0$ is the nominal reflectance value, $\Delta P$ is the reflectance coding precision value, N is the number of coding bits per reflectance error code, and X corresponds to either R, G, or B values.

Thus, the embodiment illustrated in FIG. 3 can provide the correct color reflectance values of a color calibration strip utilized for calibrating a color digital scanner.

While the present invention has been described with reference to various embodiments disclosed above, it is not confined to the details set forth above, but is intended to cover such modifications or changes as may come within the scope of the attached claims.

What is claimed is:

1. A system for calibrating a digital scanner, comprising:

a calibration strip having reference information printed thereon;

a machine readable encoded tag having characteristic values corresponding to said calibration strip reference information encoded thereon;

said machine readable encoded tag being offset in a fast-scan direction from said calibration strip;

a scanning system to scan said calibration strip and said machine readable encoded tag; and calibration means, operatively connected to said scanning system, for generating correction values from image data corresponding to scanned-in reference information and data corresponding to scanned-in characteristic values.

2. A calibration strip for a digital scanner, comprising:

a first portion having reference information printed thereon; and a second portion having machine readable characteristic values corresponding to the calibration strip reference information encoded thereon;

said second portion being offset in a fast-scan direction from said first portion.

* * * * *